United States Patent
Hong et al.

(10) Patent No.: US 7,514,111 B2
(45) Date of Patent: Apr. 7, 2009

(54) METHOD FOR PREPARING GRANULAR ANIMAL FEED ADDITIVE AND GRANULAR ANIMAL FEED ADDITIVE PREPARED BY THE METHOD

(75) Inventors: Soon Won Hong, Seocho-gu (KR); Gyu Nam Cho, Incheon (KR); Yong Bum Seo, Jongro-gu (KR); Seung Woo Han, Gangseo-gu (KR); Jae Hun Yu, Suwon (KR); Hyun Tae Kim, Seocho-gu (KR)

(73) Assignee: CJ Cheiljedang Corporation, Seoul (KR)

( * ) Notice: Subject to any disclaimer, the term of this patent is extended or adjusted under 35 U.S.C. 154(b) by 758 days.

(21) Appl. No.: 11/091,492

(22) Filed: Mar. 29, 2005

(65) Prior Publication Data
US 2005/0220933 A1 Oct. 6, 2005

(30) Foreign Application Priority Data
Apr. 2, 2004 (KR) .................... 10-2004-0022888

(51) Int. Cl.
*A23K 1/16* (2006.01)
*A23K 1/18* (2006.01)

(52) U.S. Cl. .................. 426/69; 426/302; 426/656; 426/807

(58) Field of Classification Search ............... 426/69, 426/656, 302, 807
See application file for complete search history.

(56) References Cited

U.S. PATENT DOCUMENTS

| | | | |
|---|---|---|---|
| 4,876,097 A * | 10/1989 | Autant et al. ............... 426/74 |
| 5,133,976 A | 7/1992 | Rouy | |
| 5,225,218 A * | 7/1993 | Robert ........................ 426/2 |
| 5,244,669 A * | 9/1993 | Satoh et al. ............... 424/438 |
| 5,431,933 A | 7/1995 | Binder et al. | |
| 5,622,710 A | 4/1997 | Binder et al. | |
| 5,840,358 A | 11/1998 | Hoefler et al. | |
| 5,935,635 A * | 8/1999 | Mori et al. ................ 426/656 |
| 5,990,350 A * | 11/1999 | Stevens et al. ............ 562/562 |
| 6,238,728 B1 * | 5/2001 | Ishiguri et al. ............ 426/656 |

FOREIGN PATENT DOCUMENTS

| | | |
|---|---|---|
| EP | 0467401 A1 | 1/1992 |
| EP | 0923878 A2 | 6/1999 |
| EP | 0923878 A3 | 6/1999 |
| EP | 1331220 A2 | 7/2003 |
| WO | WO 2004/054381 A1 | 7/2004 |

* cited by examiner

*Primary Examiner*—C. Sayala
(74) *Attorney, Agent, or Firm*—Rothwell, Figg, Ernst & Manbeck

(57) ABSTRACT

Provided are a method for preparing a granular animal feed additive and the granular animal feed additive prepared by the method. The method includes: filtering, with a membrane filter, a fermentation broth obtained from a lysine producing microorganism cultured in a lysine producing condition to obtain a lysine-containing filtrate and a microorganism-containing sludge; drying the filtrate to obtain a concentrate with a total solid content of 48 to 52 wt %; granule-drying the concentrate at a temperature of 50° C. to 60° C. to obtain granules; and coating the granules with a coating agent containing one or more selected from the group consisting of the sludge, a diluent or a free lysine as a lysine content adjustor, and a moisture prevention agent, to obtain lysine granules having the following properties:

| | |
|---|---|
| Lysine content (lysine sulfate) | 65% or more |
| Grain size | 300–1,200 μm, 90% or more |
| Apparent density | 620–720 kg/m$^3$ |
| Protein content | 10–15% |
| Total sugar content | >0–1% |
| Inorganic material content | >0–3% |
| Water content | >0–3% |
| Carboxylic acid content | >0–8% |
| $SO_4^-$ ion content | 20–25%. |

6 Claims, No Drawings

METHOD FOR PREPARING GRANULAR ANIMAL FEED ADDITIVE AND GRANULAR ANIMAL FEED ADDITIVE PREPARED BY THE METHOD

BACKGROUND OF THE INVENTION

This application claims priority from Korean Patent Application No. 10-2004-0022888, filed on Apr. 2, 2004, in the Korean Intellectual Property Office, the disclosure of which is incorporated herein in its entirety by reference.

1. Field of the Invention

The present invention relates to a method for preparing lysine granules used as an animal feed additive and lysine granules prepared by the method.

2. Description of the Related Art

U.S. Pat. No. 5,431,933 discloses an animal feed additive containing most of components of a fermentation broth and a method for preparing the same. According to the method disclosed in this patent, a slightly hygroscopic and sticky animal feed additive with an amino acid content of 40 to 90% can be prepared at a low cost. However, the animal feed additive has disadvantages such as a low density and a large variation in component contents. That is, the content of a lysine in the fermentation broth varies according to a fermentation condition, which in turn causes a variation in the content of a lysine contained in the animal feed additive based on the fermentation broth.

U.S. Pat. No. 5,622,710 discloses a method for preparing animal feed additive pellets, which includes: directly spray-drying a fermentation broth containing an assimilable sugar of 0.3% or less to obtain fine granules and mixing the fine granules with a binder such as water and a fermentation broth. The animal feed additive pellets prepared according to this method disclosed in this patent have a density of $550 kg/m^3$ or more, an amino acid content of 40 to 90%, and low hygroscopic property and stickiness. However, the formation of the fine granules from the fermentation broth and the mixing of the fine granules with the fermentation broth by an intensive mixer increase a process complexity.

U.S. Pat. No. 5,133,976 discloses a method for preparing an animal feed additive containing a lysine content of 35 to 48%, which includes: culturing a lysine producing microorganism while maintaining an assimilable sugar of 5 to 15 g/l; concentrating the resultant culture to obtain a concentrate with a solid content of 50 to 75%; and dehydrating the concentrate by azeotropic distillation. However, there are disadvantages in that a lysine content is low, the azeotropic distillation increases a process cost and a process complexity, and the animal feed additive is easily made into fine powders.

As described above, conventional animal feed additives containing lysine have a problem in that the contents of components of the animal feed additives are largely changed depending on various parameters of a fermentation process. Therefore, the present inventors found a method for preparing a lysine-containing animal feed additive based on a fermentation broth which has the standardized content of a lysine and excellent nutritive properties even though component contents change depending on fermentation conditions and completed the present invention.

SUMMARY OF THE INVENTION

The present invention provides a method for efficiently preparing a granular animal feed additive while maintaining the content of a lysine constant.

The present invention also provides a granular animal feed additive having a standardized lysine content prepared by the method.

According to an aspect of the present invention, there is provided a method for preparing a granular animal feed additive, which comprises: filtering, with a membrane filter, a fermentation broth obtained from a lysine producing microorganism cultured in a lysine producing condition to obtain a lysine-containing filtrate and a microorganism-containing sludge; drying the filtrate to obtain a concentrate with a total solid content of 48 to 52 wt %; granule-drying the concentrate at a temperature of 50° C. to 60° C. to obtain granules; and coating the granules with a coating agent containing one or more selected from the group consisting of the sludge, a diluent or a free lysine as a lysine content adjustor, and a moisture prevention agent, to obtain lysine granules having the following properties:

| | |
|---|---|
| Lysine content (lysine sulfate) | 65% or more |
| Grain size | 300–1,200 µm, 90% or more |
| Apparent density | 620–720 kg/m³ |
| Protein content | 10–15% |
| Total sugar content | >0–1% |
| Inorganic material content | >0–3% |
| Water content | >0–3% |
| Carboxylic acid content | >0–8% |
| $SO_4^-$ ion content | 20–25% |

According to another aspect of the present invention, there is provided a granular animal feed additive prepared by the method.

DETAILED DESCRIPTION OF THE INVENTION

The present invention provides a method for preparing a granular animal feed additive, which includes: filtering, with a membrane filter, a fermentation broth obtained from a lysine producing microorganism cultured in a lysine producing condition to obtain a lysine-containing filtrate and a microorganism-containing sludge; drying the filtrate to obtain a concentrate with a total solid content of 48 to 52 wt %; granule-drying the concentrate at a temperature of 50° C. to 60° C. to obtain granules; and coating the granules with a coating agent containing one or more selected from the group consisting of the sludge, a diluent or a free lysine as a lysine content adjustor, and a moisture prevention agent, to obtain lysine granules having the following properties:

| | |
|---|---|
| Lysine content (lysine sulfate) | 65% or more |
| Grain size | 300–1,200 µm, 90% or more |
| Apparent density | 620–720 kg/m³ |
| Protein content | 10–15% |
| Total sugar content | >0–1% |
| Inorganic material content | >0–3% |
| Water content | >0–3% |
| Carboxylic acid content | >0–8% |
| $SO_4^-$ ion content | 20–25% |

In the granulation of the present invention, the granules are preferably obtained by spraying the concentrate into a granulator from the bottom of the granulator and applying a hot air to the concentrate in the granulator to form a fluidized bed. For the granulation, a common fluidized bed granulator may be used. Considering the physical properties of starting materials and the grain sizes of the granules, the granulation can be performed in an appropriate operating condition. Preferably, the flow rate of the concentrate, a nozzle pressure, and the air volume during the granulation may be adjusted so that 90% or more of the granules have a grain size of 300 to 1,200 μm.

Preferably, the diluent is one or more selected from the group consisting of starch, carageenan, and agar. The moisture prevention agent includes a polymer, preferably liquid paraffin.

There are no limitations on the microorganism that can be used herein provided that it can produce a lysine. A strain of *Corynebacterium* sp. that is often used in lysine fermentation is preferable. Although the fermentation condition for the lysine producing microorganism is not particularly limited, it is preferable to culture the lysine producing microorganism in a condition such that a large amount of lysine and a small amount of biomass are accumulated. Since sugar contained in the fermentation broth prevents the drying of the fermentation broth and increases the hydroscopic property of the lysine granules, it is preferable to set the fermentation condition toward reduction of a sugar content. In the present invention, however, since the lysine content and the hydroscopic property can be controlled by the coating process, there is no need to limit the fermentation condition to the above-described condition.

The fermentation broth is filtered by membrane filtration. The fermentation broth is separated into the filtrate and the sludge by the filtration. The sludge contains components for animal nutrition and is reused in the subsequent coating process. There is no limitation on the membrane filter that can be used herein provided that it can separate the microorganism from the fermentation broth. One of ordinary persons skilled in the art might easily set the operating condition of the membrane filter to separate the microorganism from the fermentation broth. For example, the fermentation broth that has been previously heated at about 60° C. is pressed toward the membrane filter for about 1 hour to form a gel layer. Then, the filtration is carried out in a condition that the temperature of the fermentation broth is about 60° C. and a transmembrane pressure (TMP) is 1.2 to 1.5 atm. It is understood that one of ordinary persons skilled in the art can easily select a pore size of the membrane filter.

The filtrate obtained by the membrane filtration is dried to have a solid content of 48 to 52%. The drying process serves to reduce the total volume of the filtrate with relatively increasing lysine content by decreasing the water content of the filtrate. The drying process is well known in the art. A reduced-pressure drying may be used.

The concentrate obtained by the drying is granulated to form the granules. Preferably, the concentrate is heated at a temperature of 50° C. to 60° C. for the granulation. Within the scope of the granulation temperature, the viscosity of the concentrate decreases, which is helpful in uniform mixing of the concentrate without lumping and formation of uniform granules. If the granulation temperature exceeds 60° C., costs for the granulation is economically too high. On the other hand, if it is less than 50° C., reduction of viscosity may be insignificant, thereby making difficult to form a granule and decreasing the bulk density of the resultant granule and increasing the hygroscoposity of the resultant granule.

In the granulation, preferably, while the concentrate is continuously sprayed into a granulator, a hot air is continuously supplied so that predetermined sized particles formed by the spraying form a fluidized bed. For this, a common fluidized bed granulator may be used. The granulation may be carried in the following non-limiting conditions: a heater temperature of 170° C., an inlet temperature of 140 to 160° C., an outlet temperature of 60 to 70° C., and a spraying pressure of 1.8 to 2.0 bar.

The granules obtained by the granulation may be further subjected to a sieving process. Desired sized granules are transferred to a subsequent process. Under-sized granules may be returned to the granulation and over-sized granules may be pulverized and then returned to the granulation.

The granules obtained by the granulation or the sieving are subjected to the coating process. The coating process is well known in one of ordinary persons skilled in animal feed or drug related industries. Any coater may be used during the coating process. For example, a commercially available coater may be used. Preferably, a material that can be used for the coating process is the coating agent containing one or more selected from the group consisting of the sludge obtained by the filtration, a diluent or a free lysine as a lysine content adjustor, and a moisture prevention agent. The sludge is used for utilizing useful substances contained in the microorganism. The lysine content adjustor is used to adjust the content of lysine in the granules. Therefore, the lysine content adjustor is optionally used according to the content of lysine. That is, when the content of lysine exceeds a predetermined value, the coating agent containing the diluent is coated on the granules to decrease the content of lysine. On the other hand, when the content of lysine is less than a predetermined value, the coating agent containing the free lysine is coated on the granules to increase the content of lysine. Therefore, the lysine content of the granules obtained by the present invention can be adjusted within an error range of about 1%. The moisture prevention agent serves to decrease the hygroscopic property of the lysine granules, which enables long-term storage.

The lysine granules obtained according to a method of the present invention have the following characteristics: the content of lysine (based on lysine sulfate) is 65% or more in dry mass, a grain size of 300-1,200 μm is 90% or more, an apparent density is 620-720 kg/m$^3$, a protein content is 10-15%, a total sugar content is >0-1%, an inorganic material content is >0-3%, a water content is >0-3%, a $C_8$ or less carboxylic acid content is >0-8%, and a $SO_4^-$ ion content is 20-25%.

Hereinafter, the present invention will be described more specifically by Examples. However, the following Examples are provided only for illustrations and thus the present invention is not limited to or by them.

EXAMPLES

Example 1

Fermentation, Filtration, Concentration, and Granulation

In this Example, *Corynebacterium glutamicum* CJM107 (KCCM-10227) was cultured in 18 liters of a culture medium containing 50 g of raw sugar, 10 g of peptone, 10 g of Yeast Extract, 5 g of urea, 4 g of $KH_2PO_4$, 8 g of $K_2HPO_4$, 0.5 g of $MgSO_4 \cdot 7H_2O$, 100 μg of biotin, 1,000 μg of thiamine HCl for 96 hours at 35° C., pH 6-8 to obtain a fermentation broth. The fermentation broth contained a lysine of 15.1%.

The fermentation broth recovered was heated at 60° C. and filtered using a membrane filter (Ceramic Filter Pilot: pore size 0.05 μm, area 4.7 m$^2$) in a transmembrane pressure (TMP) of 1.2-1.5 atm to separate a microorganism sludge and a filtrate. The filtrate thus obtained has a lysine content of 18.7% and a total solid of 25.8%. The filtrate was dried under a reduced pressure of a vacuum of 680 mmHg and at a temperature of 65° C. to obtain a concentrate with a lysine content of 37.1% and a total solid of 51.2% and then the reaction temperature was reduced to 60° C. The concentrate was granulated with a granulator (GR Engineering, Fluid Bed Spray Dryer). For this, the concentrate was supplied into the granulator by a bottom spray method through a lower nozzle of the granulator. At this time, the granulator was operated in the following conditions: a heater temperature of 170° C., an inlet temperature of 140-160° C., an outlet temperature of 60-70° C., and a spray pressure of 1.8-2.0 bar. The concentrate supplied into the granulator was solidified by hot air drying. The solidified concentrate was subjected to crashing and agglomeration with a freshly supplied concentrate to form larger granules while flowing in a fluidized bed. When the granules grow into a desired size, operating of the granulator was stopped and the final granules were recovered for component analysis. The granules obtained in this Example had a lysine content of 69.4%, a water content of 0.04%, an inorganic material content of 2.53%, and an apparent density of 635.2 kg/m³.

Example 2

Preparation of Lysine Granules Coated with Coating Agent Containing Diluent

Fermentation, filtration, concentration by evaporation of a filtrate, and granulation of a concentrate were performed in the same manner as in Example 1. The filtrate had a lysine content of 13.97% and a total solid of 22.8%. The concentrate obtained by evaporation of the filtrate under a reduced pressure had a lysine content of 41.5%, a total solid of 50.5%, a volume and a specific gravity of 20 L and 1.150, respectively. The granules obtained by fluidized-bed drying of the concentrate had a lysine content of 69.2%, a water content of 0.12%, an inorganic material content of 2.53%, and a total weight of 4.1 kg.

The granules thus obtained were coated with an aqueous diluent solution (water content of 9.3%) obtained by dissolving 0.25 kg of a diluent (corn starch) in water (0.5 L) as a coating agent.

Finally obtained granules had a lysine content of 65.7%, a water content of 0.14%, protein content 0.36%, total sugar 0.8%, inorganic material 2.6%, carboxylic acid less than Carbon number 8 7.6% and sulfate ion 22.8%. The bulk density and the weight of the resultant granules were 634.5 kg/m³ and 4.3 kg, respectively.

Example 3

Preparation of Granules Coated with Coating Agent Containing Microorganism Sludge and Lysine Content Adjustor Fermentation, filtration, evaporative concentration, and granulation were performed in the same manner as in Example 1 except that the granules were coated with a coating agent containing a microorganism sludge obtained by the filtration and a free lysine.

In this Example, the fermentation broth was obtained in an amount of 30.0 L and had a lysine content of 15.5%. The filtrate had a lysine content of 18.7% and a total solid of 25.8%. The concentrate obtained by evaporation of the filtrate under a reduced pressure had a lysine content of 30.2%, a total solid of 50.3%, a water content 49.7%, a volume and a specific gravity of 15.4 L and 1.210, respectively. The granules obtained by fluidized-bed drying of the concentrate had a lysine content of 68.9%, a water content of 0.26%, an inorganic material content of 2.29%, and a density of 650.3 kg/m³, and a total weight of 1.06 kg.

The granules thus obtained were coated with a mixture obtained by dissolving 0.2 kg of the solid of the microorganism sludge obtained by the filtration, and 123 g of a 99% free lysine (to adjust the total lysine content of finally obtained granules to 65% including the consideration of the lysine content of the microorganism sludge and the like) in water.

The finally obtained granules had a lysine content of 65.4%, a protein content 2.25%, total sugar content 1.05%, carboxylic acid having less 8 carbon number 7.6%, a water content of 0.23%, an inorganic material content of 2.67% and sulfate ion content 20.8%. The bulk density and the weight of the resultant granules were 642.6 kg/m³ and 1.65 kg. 91.3% of the granules had a grain size of 300-1,200 μm.

As apparent from the above descriptions, according to a method of the present invention, very uniform lysine granules with a lysine content within an error range of about 1% and significantly low sugar content can be obtained. Therefore, when the lysine granules are used as an animal feed additive, they can be stored for a long-term due to a low hygroscopic property and the usage amount of the lysine granules can be precisely adjusted.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for preparing a granular animal feed additive, which comprises:

filtering, with a membrane filter, a fermentation broth obtained from a lysine producing microorganism cultured in a lysine producing condition to obtain a lysine-containing filtrate and a microorganism-containing sludge;

drying the filtrate to obtain a concentrate with a total solid content of 48 to 52 wt %;

granule-drying the concentrate at a temperature of 50° C. to 60° C. to obtain granules; and coating the granules with a coating agent containing a lysine content adjuster and one or more additives selected from the group consisting of the sludge, and a moisture prevention agent, wherein the lysine content adjuster is a diluent or free lysine depending on the lysine content of the granule, to obtain lysine granules having the following properties:

| | |
|---|---|
| Lysine content (lysine sulfate) | 65% or more |
| Grain size | 300–1,200 μm, 90% or more |
| Apparent density | 620–720 kg/m³ |
| Protein content | 10–15% |
| Total sugar content | >0–1% |
| Inorganic material content | >0–3% |
| Water content | >0–3% |
| Carboxylic acid content | >0–8% |
| $SO_4^-$ ion content | 20–25% | and wherein the animal feed additive has a constant content of lysine.

2. The method of claim 1, wherein in the granulating, the granules are formed by spraying the concentrate into a granulator through the bottom of the granulator and applying a hot air to the concentrate in the granulator.

3. The method of claim 1, wherein in the granulating, the flow rate of the concentrate, a nozzle pressure, and air volume are adjusted so that 90% or more of the granules have a grain size of 300 to 1,200 μm.

4. The method of claim 1, wherein the diluent is one or more selected from the group consisting of starch, carageenan and agar.

5. The method of claim 1, wherein the moisture prevention agent is a liquid paraffin.

6. The method of claim 1, wherein the lysine producing microorganism is a strain of *Corynebacterium* sp.

* * * * *